(12) United States Patent
Fredette et al.

(10) Patent No.: US 11,334,496 B2
(45) Date of Patent: May 17, 2022

(54) METHOD AND SYSTEM FOR PROVIDING PROCESSOR-ADDRESSABLE PERSISTENT MEMORY TO GUEST OPERATING SYSTEMS IN A STORAGE SYSTEM

(71) Applicant: EMC IP Holding Company LLC, Hopkinton, MA (US)

(72) Inventors: Matthew H. Fredette, Belmont, MA (US); Jonathan I. Krasner, Coventry, RI (US); Jean-Pierre Bono, Westboro, MA (US); Chakib Ouarraoui, Watertown, MA (US); Adnan Sahin, Needham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 16/705,307

(22) Filed: Dec. 6, 2019

(65) Prior Publication Data

US 2021/0173586 A1 Jun. 10, 2021

(51) Int. Cl.
*G06F 12/10* (2016.01)
(52) U.S. Cl.
CPC ........ *G06F 12/10* (2013.01); *G06F 2212/151* (2013.01)

(58) Field of Classification Search
CPC .......................... G06F 12/10; G06F 2212/151
See application file for complete search history.

(56) References Cited

U.S. PATENT DOCUMENTS

| | | | | |
|---|---|---|---|---|
| 5,555,385 A * | 9/1996 | Osisek | ............... | G06F 12/1475 711/1 |
| 7,596,654 B1 * | 9/2009 | Wong | .................. | G06F 12/0813 703/21 |
| 10,754,574 B1 * | 8/2020 | Jo | ........................... | G06F 3/064 |
| 2015/0378759 A1 * | 12/2015 | Pershin | .............. | G06F 9/45558 718/1 |
| 2016/0246731 A1 * | 8/2016 | Koob | .................... | G06F 11/073 |
| 2016/0314079 A1 * | 10/2016 | Medovich | ........... | G06F 12/1072 |
| 2017/0177224 A1 * | 6/2017 | Glover | ................. | G06F 3/0653 |

* cited by examiner

*Primary Examiner* — Chie Yew
(74) *Attorney, Agent, or Firm* — Chamberlain, Hrdlicka, White, Williams & Aughtry (57) ABSTRACT

A method for managing data includes obtaining, by a hypervisor on a host computing device, a write request for storing first data, and in response to the write request: identifying a first set of memory segments associated with the first data using a memory mapper, wherein the first set of memory segments is associated with a memory device, making a first determination that the memory device is local to the host computing device, and in response to the first determination: storing the first data in the first set of memory segments.

5 Claims, 7 Drawing Sheets

METHOD AND SYSTEM FOR PROVIDING PROCESSOR-ADDRESSABLE PERSISTENT MEMORY TO GUEST OPERATING SYSTEMS IN A STORAGE SYSTEM

BACKGROUND

Processes executing on computing devices may utilize any number of internal components such as processors, memory, and persistent storage. If such processes require additional resources, the traditional approach is to increase the number of resources (e.g., processors, memory, etc.) within the computing device.

SUMMARY

In general, in one aspect, the invention relates to a method for managing data. The method includes obtaining, by a hypervisor on a host computing device, a write request for storing first data, and in response to the write request: identifying a first set of memory segments associated with the first data using a memory mapper, wherein the first set of memory segments is associated with a memory device, making a first determination that the memory device is local to the host computing device, and in response to the first determination: storing the first data in the first set of memory segments.

In general, in one aspect, the invention relates to a non-transitory computer readable medium comprising computer readable program code, which when executed by a computer processor enables the computer processor to perform a method for managing data. The method includes obtaining, by a hypervisor on a host computing device, a write request for storing first data, and in response to the write request: identifying a first set of memory segments associated with the first data using a memory mapper, wherein the first set of memory segments is associated with a memory device, making a first determination that the memory device is local to the host computing device, and in response to the first determination: storing the first data in the first set of memory segments.

In general, in one aspect, the invention relates to a system that includes a processor, a hypervisor executing on the processor, and a memory device. The processor is programmed to: obtain a write request for storing first data, and in response to the write request: identify a first set of memory segments associated with the first data using a memory mapper, wherein the first set of memory segments is associated with the memory, make a first determination that the memory device is local to the host computing device, and in response to the first determination: store the first data in the first set of memory segments.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for utilizing memory devices of a number of host computing devices. Specifically, embodiments of the invention relate to utilizing a hypervisor of a host computing device to manage a memory mapper. The memory mapper may map virtual memory to memory ranges in one or more physical memory devices. The physical memory devices may be located in the host computing device on which the hypervisor is executing or in other host computing device. The memory mapper may be used to provide virtual machines with available memory ranges that enable the virtual machine to store its data to in local and remote memory devices.

Figure 1:
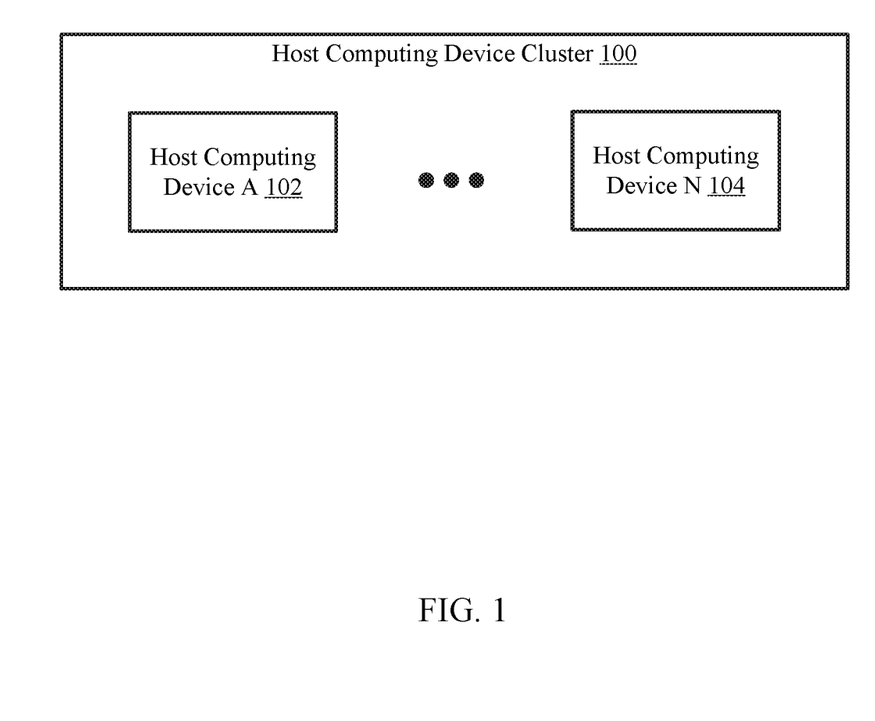
FIG. 1 shows a diagram of a system in accordance with one or more embodiments of the invention.

FIG. 1 shows a diagram of a system in accordance with one or more embodiments of the invention. The system may include a host computing device cluster (100). The host computing device cluster (100) may include one or more host computing devices (102, 104). Each host computing device (102, 104) may be operably connected via any combination of wired and/or wireless connections. The host computing device cluster (100) may include additional, fewer, and/or different components without departing from the invention.

In one or more embodiments of the invention, each host computing device (102, 104) includes one or memory devices (discussed below). Each memory device may be used for the purpose of storing data. The connections between the host computing devices (102, 104) may enable a host computing device (e.g., 102) to utilize a memory device of a second host computing device (e.g., 104).

Figure 5:
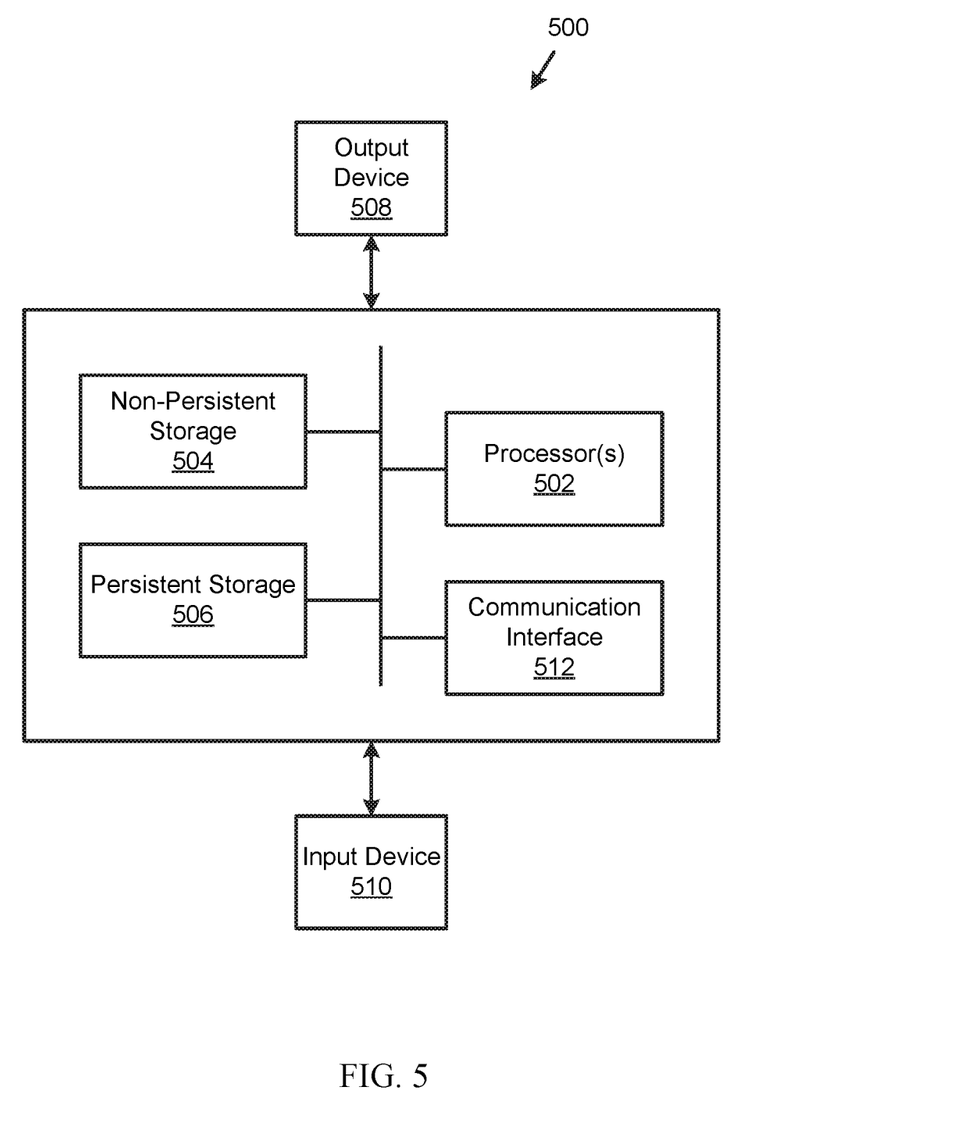
FIG. 5 shows a diagram of a computing device in accordance with one or more embodiments of the invention.

In one or more embodiments of the invention, the host computing device is implemented as a computing device (see, e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host computing device (102, 104) described throughout this application. For additional details regarding the host computing devices, see, e.g., FIG. 2A.

Figure 2A:
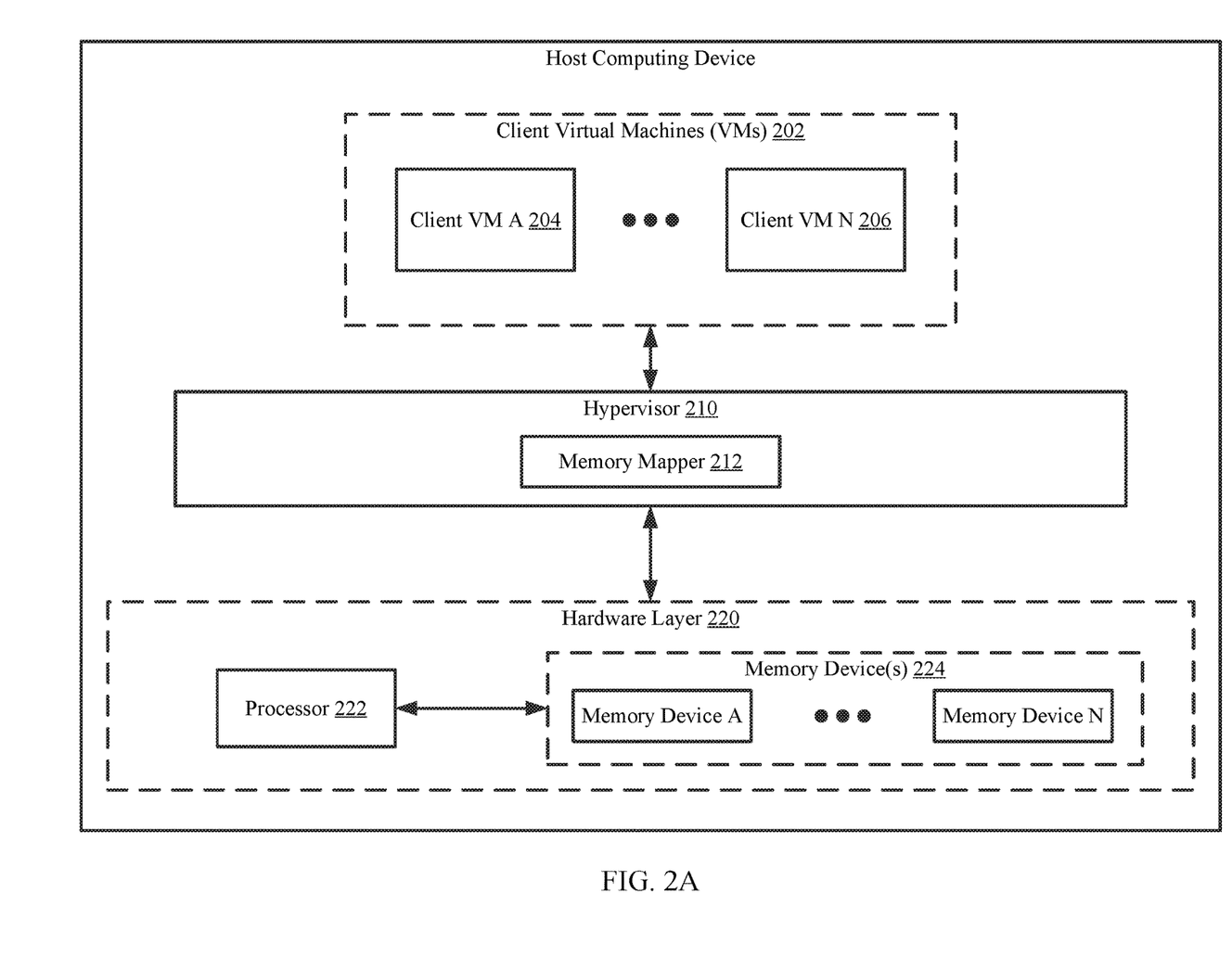
FIG. 2A shows a diagram of a host computing device in accordance with one or more embodiments of the invention.

FIG. 2A shows a diagram of a host computing device in accordance with one or more embodiments of the invention. The host computing device (200) may include any number of client virtual machines (VMs) (202), a hypervisor (210), and a hardware layer (220). The host computing device (200) may include additional, fewer, and/or different components without departing from the invention. Each of the components illustrated in FIG. 2A is discussed below.

In one or more embodiments of the invention, the host computing device (200) hosts any number of client VMs (also referred to simply as VMs) (202). The client VMs (202) may be logical entities executed using computing resources (e.g., components of a hardware layer (220)) of the host computing device (200). Each of the virtual machines may be performing similar or different processes. In one or more embodiments of the invention, the virtual machines provide services to users, e.g., clients (not shown). For example, the virtual machines may host instances of databases, email servers, and/or other applications. The virtual machines may host other types of applications without departing from the invention.

In one or more embodiments of the invention, each client VM (204, 206) operates using a guest operating system (OS) executing in the client VM. The guest OS may enable the aforementioned users to operate the virtual machine, and may further enable the client VMs (204, 206) to utilize the components of the hardware layer (e.g., 220) of the host computing device (200) and/or of other host computing devices of the host computing device cluster discussed in FIG. 1.

In one or more embodiments of the invention, each client VM (204, 206) is equipped to store data associated with the corresponding VM (204, 206). The client VMs (204, 206) may perform the data storage via the methods illustrated in FIGS. 3A-3B. The data storage may be performed via other methods without departing from the invention.

Figure 3A:
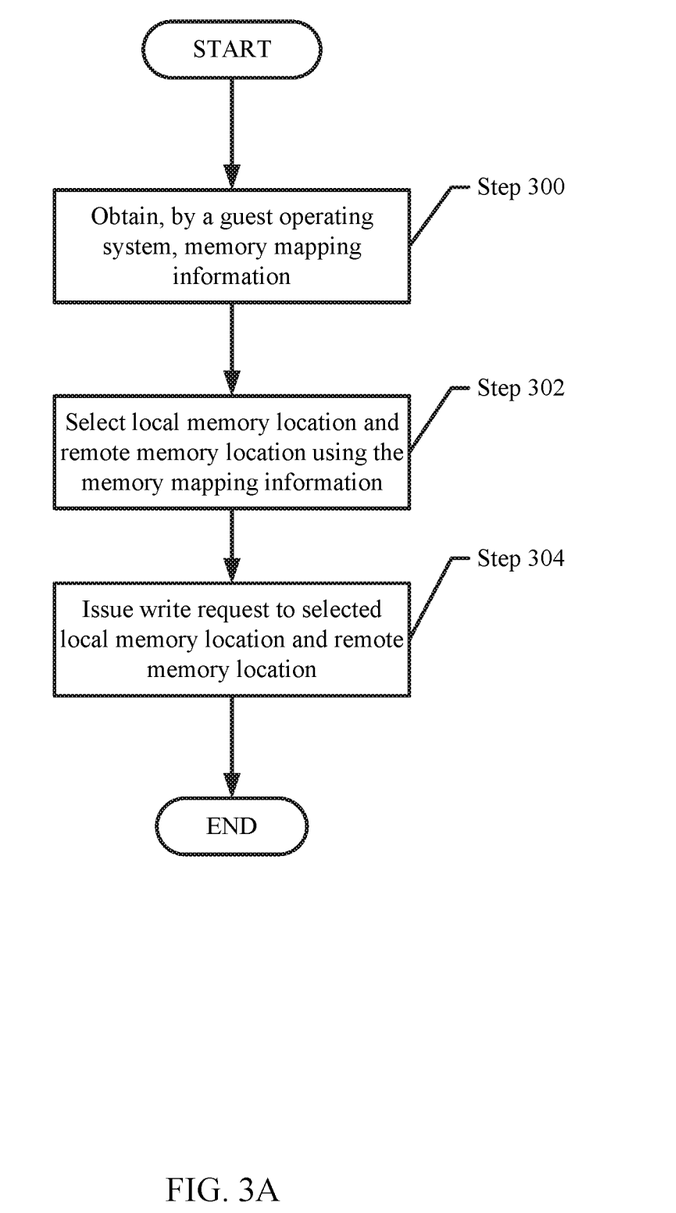
FIG. 3A shows a flowchart for managing data storage in a guest virtual space in accordance with one or more embodiments of the invention.
Figure 3B:
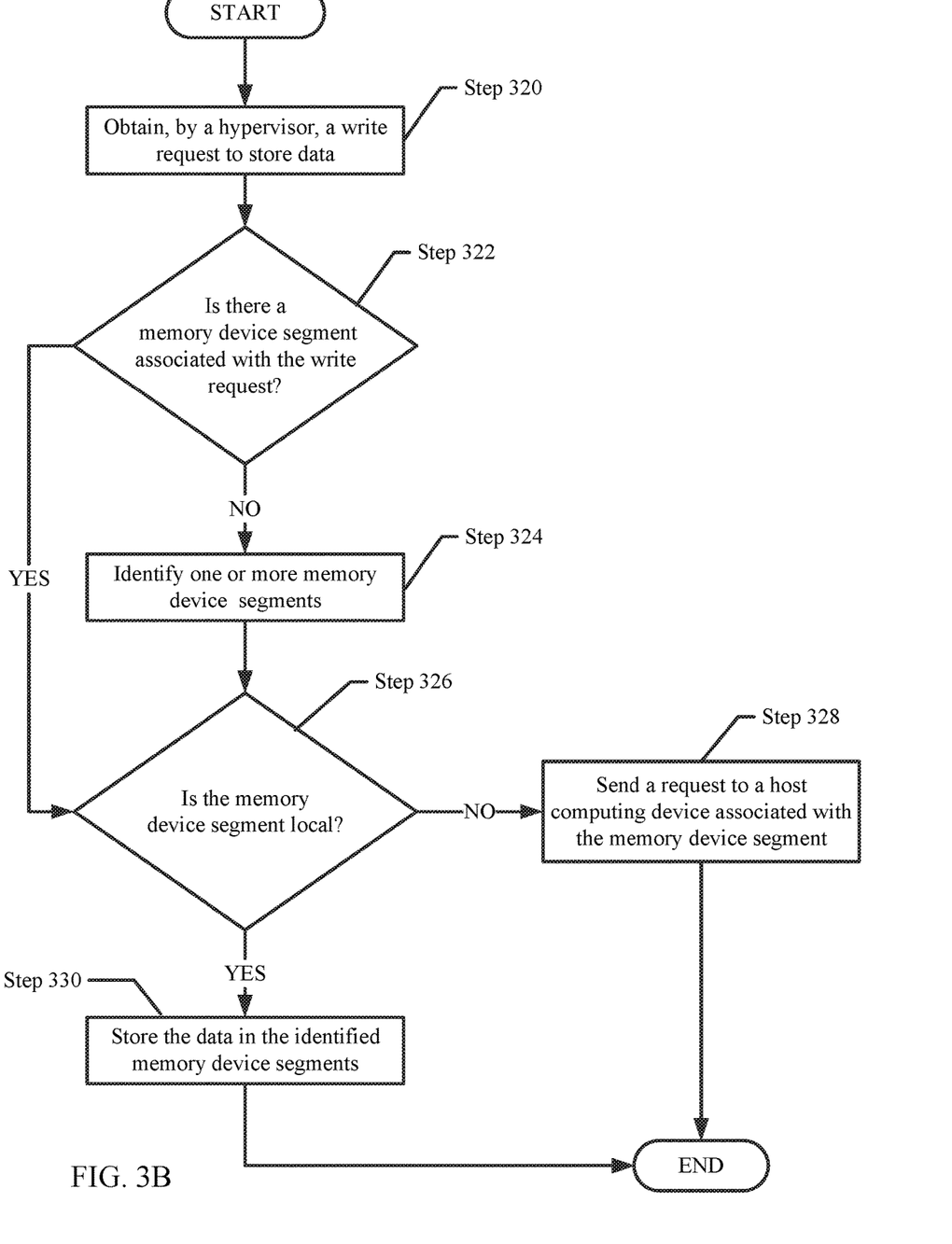
FIG. 3B shows a flowchart for managing write requests in accordance with one or more embodiments of the invention.

In one or more of embodiments of the invention, the virtual machines (202, 204) are implemented as computer instructions, e.g., computer code, stored on a persistent storage that when executed by a processor(s) (e.g., 222) of the host computing device (200) cause the host computing device (200) to provide the functionality of the virtual machines (202, 204) described throughout this application and/or all, or a portion thereof, of the methods illustrated in FIGS. 3A and 3B.

In one or more embodiments of the invention, the host computing device (200) operates using a hypervisor (210). The hypervisor (210) is software that includes an operating system that manages the operation of the client VMs (202) and the hardware layer (220). The hypervisor (210) may service requests obtained from one or more of the client VMs (202). In one or more embodiments of the invention, the hypervisor (210) services the requests by accessing a memory mapper (212) to identify a memory range in which to store data associated with the requests and storing the data accordingly. The hypervisor (210) may service the requests in accordance with FIG. 3B.

In one or more embodiments of the invention, the hypervisor (210) is implemented as computer instructions, e.g., computer code, stored on a persistent storage that when executed by a processor(s) (e.g., 222) of the host computing device (200) cause the host computing device (200) to provide the functionality of the hypervisor (210) described throughout this application.

In one or more embodiments of the invention, the hypervisor (210) includes a memory mapper (212) that manages the mapping of virtual memory segments of one or more client VMs (202) to memory device segments of memory devices (e.g., 224 of the host computing device (200)) and/or of other host computing devices. The memory mapper (212) may store a virtual memory space mapping that associates each virtual memory segment to a physical memory device segment of a memory device (224) or a memory device segment of a memory device that is not located on the host computing device. The hypervisor may obtain write requests for storing data in virtual memory and utilize the virtual space memory mapping to identify the associated physical memory. For additional details regarding the virtual space memory mapping, see, e.g., FIG. 2B.

Further, the memory mapper (212) may include functionality for providing memory mapping information (described below in FIG. 3A) to a client VM (202, 204) via the corresponding guest OSes of the client VMs (202, 204). The memory mapper may manage any write requests obtained from the client VMs (202) in accordance with FIG. 3B. The memory mapper (212) may further include functionality that allows the memory mapper (212) to communicate with the guest OS of each of the VMs (202).

In one or more embodiments of the invention, the memory mapper (212) is implemented as computer instructions, e.g., computer code, stored on a persistent storage that when executed by a processor(s) (e.g., 222) of the host computing device (200) cause the host computing device (200) to provide the functionality of the memory mapper (212) described throughout this application.

In one or more embodiments of the invention, the hardware layer (220) includes computing resources utilized by components (e.g., the hypervisor (210), client VMs (202)) of the host computing device (200) to perform the functionalities specified by each respective component. The computing resources may include one or more processors (222) and memory devices (224). Each computing resource of the hardware layer (220) may be operably connected via any combination of wired connections. Each computing resource of the hardware layer (220) is discussed below.

The processor (222) may be a computing resource that processes information (e.g., data) as requested by a component and sends the processed data to the requested entity. Processing data may include arithmetic calculations, logic processing, and/or other input/output operations without departing from the invention. In one or more embodiments of the invention, the processor (222) is implemented as a central processing unit (CPU) with single-core or multi-core processing capabilities. The processor (222) may be other types of processors without departing from the invention.

In one or more embodiments of the invention, each memory device (224) is a device that includes physical memory segments. Examples of memory (238) devices include, but are not limited to, certain integrated circuit storage (e.g., flash memory, random access memory (RAM), dynamic RAM (DRAM), resistive RAM (ReRAM), etc.). Further, hybrid devices that contain multiple forms of storage (e.g., a non-volatile dual in-line memory module (NVDIMM)) may be considered "memory" if the hybrid device component that interacts with the node is capable of being accessed and/or manipulated at a "byte-level". For example, a "persistent memory" (PMem) module that includes, for example, a combination of DRAM, flash memory, and a capacitor (for persisting DRAM data to flash memory in the event of power loss) is considered "memory" as the DRAM component (the component of the module accessible by the memory management unit) is capable of being accessed and/or manipulated at a "byte-level".

While FIG. 2A shows the architecture of the host computing device, the invention is not limited to the architecture shown in FIG. 2A.

Figure 2B:
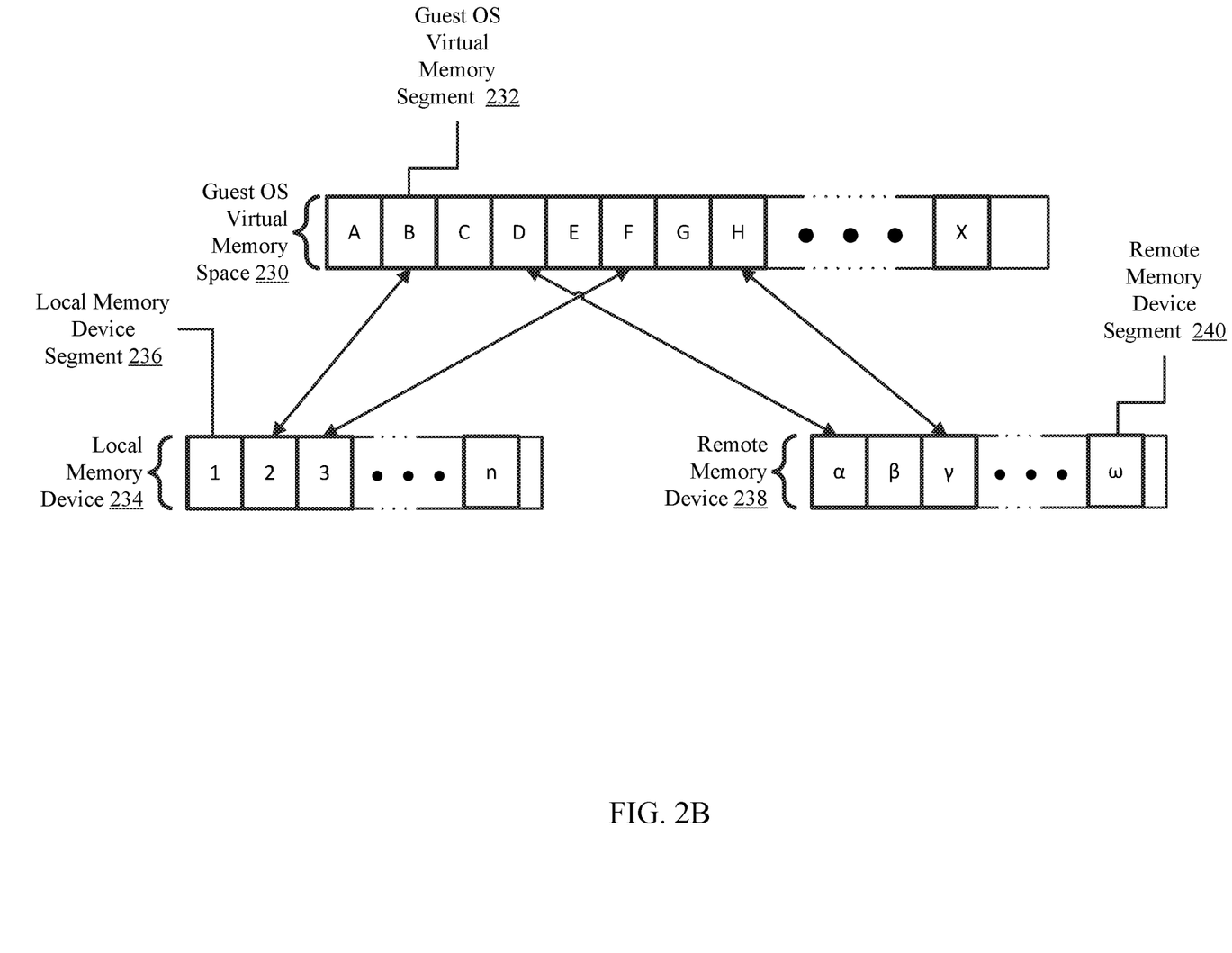
FIG. 2B shows a diagram of a virtual memory space mapping in accordance with one or more embodiments of the invention.

FIG. 2B shows a diagram of a virtual memory space mapping in accordance with one or more embodiments of the invention. The virtual space memory mapping includes a mapping between a guest OS virtual memory space (230) and at least one local memory device (232) and at least one remote memory device (236). Each of the aforementioned portions of the virtual memory space mapping is discussed below.

In one or more embodiments of the invention, the guest OS virtual memory space (230) is a collection of one or more guest OS virtual memory space segments (232) to be used by a guest OS of a client VM. The guest OS virtual memory space segments (e.g., 232) may be referred to as simply virtual segments. Each guest OS virtual memory space segment (232) is associated, using the memory mapper, with a physical memory device segment. The physical memory device segment may be a local memory device segment (e.g., 236) or a remote memory device segment (240). For the sake of brevity, not all associations between guest OS virtual memory space segments and physical memory device segments in the virtual memory space mapping are illustrated in FIG. 2B. The virtual memory space mapping may specify each of the associations.

In one or more embodiments of the invention, when the memory mapper managing the virtual memory space mapping obtains a write request that specifies writing data to one or more guest OS virtual memory space segments, the memory mapper may identify the physical memory device segments associated with the specified virtual memory segments and initiate writing the data to the identified physical memory device segments.

In one or more embodiments of the invention, the physical memory devices may be specified as local memory devices (e.g., 234) and remote memory devices (e.g., 238). In one or more embodiments of the invention, a local memory device (234) is a physical memory device that is stored in the same host computing device hosting the guest OS. In contrast, a remote memory device (238) is a physical memory device that is stored in a second host computing device from the host computing device hosting the guest OS.

Each physical memory device (e.g., 234, 238) may include one or more physical memory device segments (e.g., 236, 240). All or a portion thereof of the physical memory segments of a memory device (e.g., 234, 238) may be associated with a guest OS virtual memory space segment without departing from the invention. In other words, an embodiment of the invention may include a physical memory device in which only a portion of the physical memory device segments of the physical memory device are associated with virtual memory segments of a guest OS virtual memory space.

In one or more embodiments of the invention, the memory mapper maintains a virtual memory space mapping for each guest OS operating in the host computing device. Each guest OS may be associated with its own guest OS virtual memory space (e.g., 230). Further, each the physical memory devices (local and/or remote) may include physical memory device segments for one or more of the guest OS virtual memory spaces without departing from the invention.

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIG. 3A-3B without departing from the scope of the invention.

FIG. 3A shows a flowchart for managing data storage in accordance with one or more embodiments of the invention. The method shown in FIG. 3A may be performed by, for example, a client VM (202, 204, FIG. 2A). Other components of the system illustrated in FIG. 2A may perform the method of FIG. 3A without departing from the invention.

Turning to FIG. 3A, in step 300, memory mapping information is obtained. In one or more embodiments of the invention, the memory mapping information is obtained from the hypervisor. The memory mapping information may be obtained, for example, in response to a request by the guest OS of the client VM to obtain the memory mapping information.

In one or more embodiments of the invention, the memory mapping information is a data structure that specifies the virtual memory segments available for use by the client VM. Further, the memory mapping information may specify additional information about the type of physical device segments associated with the available virtual segments. The additional information may be, for example, whether the physical memory device segments are associated with local or remote memory devices. The additional information may further specify the type of memory device (e.g., persistent memory, DRAM, etc.) that the virtual memory segments are associated with. The additional information may be other information without departing from the invention.

In step 302, local memory location and remote memory location is selected using the memory mapping information. In one or more embodiments of the invention, the guest OS uses the information specified in the memory mapping information to select one or more virtual memory segments in which to write data. The data may be, for example, data that has to be mirrored (e.g., replicated). In this scenario, the guest OS may directly select virtual memory segments that are associated with local memory device segments and remote memory device segments. Thus, the guest OS may be able to issue write requests to segments in its virtual memory space that are mapped to local and remote memory device segments thereby directly managing the replication of data across local and remote devices without requiring the hypervisor to manage the replication of data. Moreover, the memory mapping information provides the guest OS visibility into the underlying mapping of virtual memory space to memory device segments, thereby allowing the guest OS the ability to select where its data is physically stored.

Continuing with the discussion of FIG. 3A, in step 304, a write request is issued to the selected local memory location and remote memory location. In one or more embodiments of the invention, a hypervisor of the local memory location may obtain the write requests and perform the method of FIG. 3B to write the data to the corresponding physical memory segments or, if the memory location is a remote memory location, to forward the write request to a hypervisor of the remote memory location.

Those skilled in the art will appreciate that the guest OS is not required to perform mirroring (or any other form of data replication). Rather, the invention may be applied to any scenario in which the guest OS is determining, using the memory mapping information, where to write data to physical memory device segments that are mapped to its virtual memory segments.

FIG. 3B shows a flowchart for managing write requests in accordance with one or more embodiments of the invention. The method shown in FIG. 3B may be performed by, for example, a hypervisor (210, FIG. 2A). Other components of the system illustrated in FIG. 2A may perform the method of FIG. 3B without departing from the invention.

Turning to FIG. 3B, in step in step 320, a write request is obtained. The data write may be obtained from a client VM in the host computing device. The write request may specify, for example, a virtual memory segment in which to store the data. The virtual memory segment may be specified using a memory address. The memory address may include, for example, a memory offset of the virtual memory space and a range (i.e., a number of contiguous memory segments associated with the size of the data) in the virtual memory space. The memory address may specify other portions of the virtual memory space without departing from the invention.

In step 322, a determination is made about whether there is a physical memory device segment associated with the virtual memory segment in the write request. This determination may be made using the memory mapper. The mappings maintained by the memory mapper may be created at any time prior to step 322. Alternatively, the mappings may be created in accordance with step 324.

If there is a physical memory device segment associated with the virtual memory segment, the method proceeds to step 326; otherwise, the method proceeds to step 324.

In step 324, one or more memory device segments are mapped to the virtual memory segments specified in the write request. The aforementioned mapping is tracked in the memory mapper. The memory device segments that are mapped as part of step 324 correspond to currently unmapped physical memory device segments of a guest OS virtual memory space associated with the client VM. The virtual memory segments are identified by selecting one or more virtual memory segments of which data has not been written to. The selected virtual memory segments may be specified to the guest OS for future data storage.

In step 326, a determination is made about whether the memory device segment, which is mapped to the virtual memory device segment in the write request, is local to the host computing device. The determination in step 326 may be made by the memory mapper. If the memory device segment is local to the host computing device, the method proceeds to step 330; otherwise, the method proceeds to step 328.

In step 328, following the determination that the memory device is not local, a request is sent by the hypervisor to a host computing device associated with the memory device. The request may specify the memory segment(s) of the remote memory device along with data to be stored in the specified memory segment(s). The request may be sent via any communication mechanism (e.g., via network) using any type of communication (or data transfer) protocol (e.g., remote direct memory access). The method may end following step 328.

In step 330, following the determination that the memory device segments is local, the data is stored in the identified physical memory segments. The hypervisor, via a processor of the host computing device, may store the data in the specified memory device segments. The method may end following step 330.

Example

Figure 4:
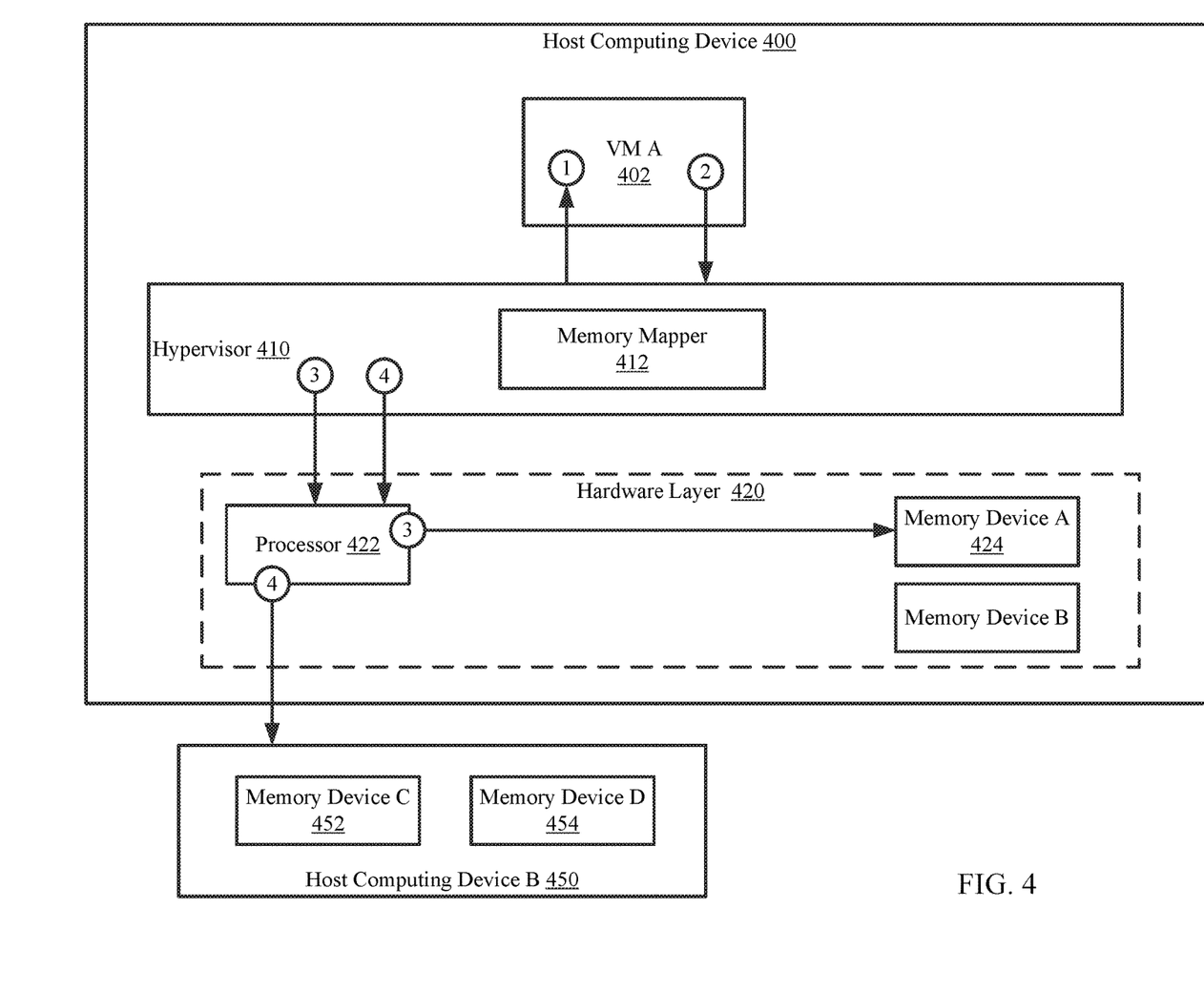
FIG. 4 show an example in accordance with one or more embodiments of the invention.

The following section describes an example. The example, illustrated in FIG. 4, is not intended to limit the invention. Turning to the example, consider a scenario in which a VM (402) of a host computing device (400) is storing data.

FIG. 4 shows an example system. The example system includes the host computing device (400). The host computing device includes a VM A (402), a hypervisor (410), and a hardware layer (420). The example system further includes a host computing device B (450) that includes a memory device C (452) and a memory device D (454). For the sake of brevity, not all components that may be included in host computing device A (400) and host computing device B (450) are illustrated or discussed below.

At [1], the hypervisor (410) sends memory mapping information to VM A (402). The memory mapping information may specify the virtual memory segments in a guest OS virtual memory space of VM A (402) and whether each virtual memory segment is associated with a remote memory device segment or a local memory device segment. VM A uses the memory mapping information to determine which virtual memory segments to write its data.

At [2], VM A sends a write request to the hypervisor (410) to store data in memory. The write request specifies a set of virtual memory segments in which the data is to be stored. The virtual segments specified at [2] are associated with local memory device segments.

At [3], a memory mapper (412) in the hypervisor (410), following the method of FIG. 3A, identifies a set of physical memory segments associated with the set of virtual memory segments using a virtual memory space mapping that associates each virtual memory segment to a physical memory segment of a memory device. The memory mapper (412) identifies the associated physical memory segments based on the associations specified in the virtual memory space mapping. The memory segments are identified to be located in memory device A (424).

The hypervisor (410) uses a processor (422) of the hardware layer (420) to store the data in the identified memory segments of memory device A (424).

At [4], a second write request is obtained by the hypervisor to store mirrored data of the data written at [3]. The second write request may specify a second set of virtual memory segments in which the second data is to be stored.

The memory mapper, following the method of FIG. 3A, identifies a second set of physical memory segments that are associated with the second write request. The second set of physical memory segments are identified as located in memory device C (452).

The hypervisor (410), via the processor (422), sends a request to host computing device B (450) that specifies storing the second data in the identified memory segments of memory device C (452).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the use of computing resources such as memory by enabling computing devices to utilize the computing resources of other computing devices and managing the usage of the computing resources. Embodiments of the invention include managing a virtual memory space for each guest OS of a virtual machine that specifies memory segments of one or more computing devices and providing memory mapping information to the virtual machines to be used to identify where the data may be stored. The virtual machines may utilize the available memory segments to store the data in memory, and the virtual machines are made aware about whether the memory is local or remote. This may enable the virtual machines to perform mirroring of data that may be written locally and remotely at a guest OS level.

Thus, embodiments of the invention may address the problem of inefficient use of computing resources. This problem arises due to the technological nature of the environment in which data storage is performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
sending, by a hypervisor, memory mapping information to a client virtual machine (VM), wherein the hypervisor and the client VM are executing on a host computing device, and wherein the memory mapping information specifies:
a first guest OS virtual memory segment mapped to a first memory device segment in a remote memory device within a remote host computing device;
a type of memory of the first memory device;
a second guest OS virtual memory segment mapped to a second memory device segment in a local memory device;
and a second type of memory of the second memory device;
obtaining, by the client VM, the memory mapping information;
in response to the obtaining:
based on determination, by the client VM, to store data in the remote memory device and the local memory device, the client VM utilizes the memory mapping information to select i) the first guest OS virtual memory segment and ii) the second guest OS virtual memory segment;
issuing, by the client VM to the hypervisor, a write request to the first guest OS virtual memory segment;
after the sending, receiving, by the hypervisor, the write request;
and in response to receiving the write request:
identifying, using a memory mapper in the hypervisor, the first memory device segment mapped to the first guest OS virtual memory segment;
in response to identifying the first memory device segment, issuing, by the hypervisor, request to the remote host computing device specifying storing of the data in the first memory device segment;
issuing, by the client VM to the hypervisor, a second write request to the second guest OS virtual memory segment;
after the sending, receiving, by the hypervisor, the second write request;
and in response to receiving the second write request:
identifying, using the memory mapper in the hypervisor, the second memory device segment mapped to the second guest OS virtual memory segment;

in response to identifying the second memory device segment, storing, by the hypervisor, the data in the second memory device segment.

2. The method of claim 1, wherein the first memory device is a persistent memory (PMem) device.

3. The method of claim 1, further comprising:
sending, by the hypervisor, second memory mapping information to a second client VM, wherein the second client VM is executing on the host computing device and wherein the second memory mapping information specifies that a second memory device segment of the first memory device is mapped to a third guest OS virtual memory segment.

4. A non-transitory computer readable medium comprising computer readable program code, which when executed by a computer processor enables the computer processor to perform a method for managing data, the method comprising:
sending, by a hypervisor on a host computing device, memory mapping information to a client virtual machine (VM),
wherein the hypervisor and the client VM are executing on the host computing device,
and wherein the memory mapping information specifies:
a first guest OS virtual memory segment mapped to a first memory device segment in a remote memory device within a remote host computing device;
a type of memory of the first memory device;
a second guest OS virtual memory segment mapped to a second memory device segment in a local memory device;
and a second type of memory of the second memory device;
obtaining, by the client VM, the memory mapping information;
in response to the obtaining:
based on determination, by the client VM, to store data in the remote memory device and the local memory device, the client VM utilizes the memory mapping information to select i) the first guest OS virtual memory segment and ii) the second guest OS virtual memory segment;
issuing, by the client VM to the hypervisor, a write request to the first guest OS virtual memory segment;
after the sending, receiving, by the hypervisor, the write request;
and in response to receiving the write request:
identifying, using a memory mapper in the hypervisor, the first memory device segment mapped to the first guest OS virtual memory segment;
in response to identifying the first memory device segment, issuing, by the hypervisor, request to the remote host computing device specifying storing of the data in the first memory device segment;
issuing, by the client VM to the hypervisor, a second write request to the second guest OS virtual memory segment;
after the sending, receiving, by the hypervisor, the second write request;
and in response to receiving the second write request:
identifying, using the memory mapper in the hypervisor, the second memory device segment mapped to the second guest OS virtual memory segment;
in response to identifying the second memory device segment, storing, by the hypervisor, the data in the second memory device segment.

5. A system, comprising:
a processor;
a hypervisor executing on the processor;
a memory device;
and wherein the hypervisor is programmed to:
send memory mapping information to a client virtual machine (VM),
wherein the hypervisor and the client VM are executing on a host computing device,
and wherein the memory mapping information specifies:
a first guest OS virtual memory segment mapped to a first memory device segment in a remote memory device within a remote host computing device;
a type of memory of the first memory device;
a second guest OS virtual memory segment mapped to a second memory device segment in a local memory device;
and a second type of memory of the second memory device;
after the send, obtain a write request;
and in response to obtaining the write request:
identify, using a memory mapper in the hypervisor, the first memory device segment mapped to the first guest OS virtual memory segment;
in response to identifying the first memory device segment, issue request to the remote host computing device specifying storing of data in the first memory device segment;
after the send, receive a second write request;
and in response to receiving the second write request:
identify, using the memory mapper in the hypervisor, the second memory device segment mapped to the second guest OS virtual memory segment;
in response to identifying the second memory device segment, store the data in the second memory device segment;
wherein the client VM is programmed to:
obtain the memory mapping information;
in response to obtaining the memory mapping information,
based on determination to store the data in the remote memory device and the local memory device, utilize the memory mapping information to select i) the first guest OS virtual memory segment and ii) the second guest OS virtual memory segment;
issue, to the hypervisor, the write request to the first guest OS virtual memory segment;
and issue, to the hypervisor, the second write request to the second guest OS virtual memory segment.

* * * * *